June 24, 1924.
G. W. OAKES
1,499,247
COMBINED DUST AND AIR CAP FOR VALVE STEMS
Filed Dec. 18, 1923
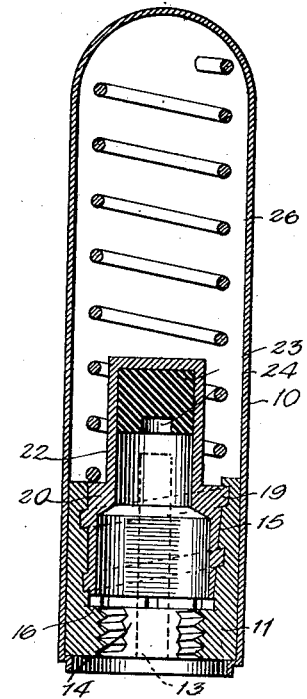
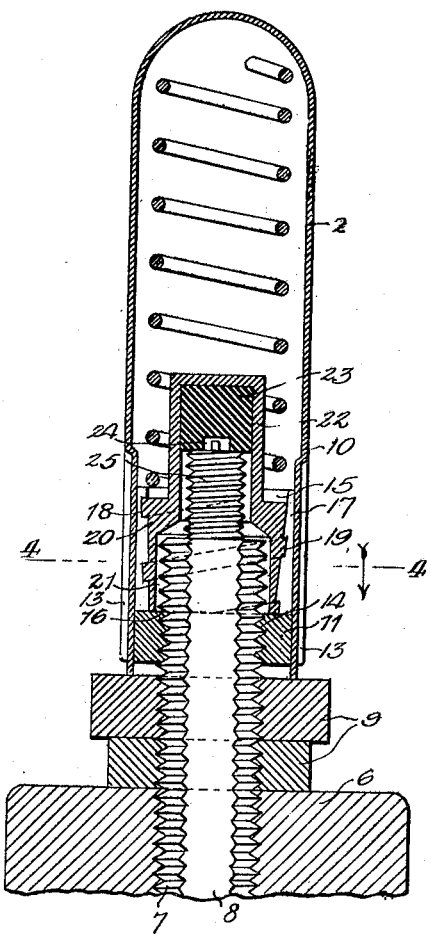
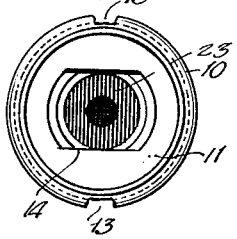
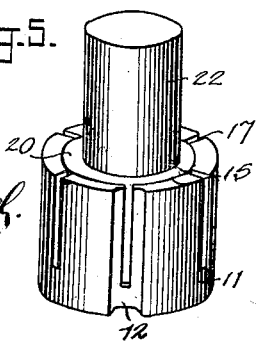
WITNESSES
William P. Goebel
E. L. Mueller
INVENTOR
G. W. OAKES
BY
ATTORNEYS Patented June 24, 1924.

1,499,247

UNITED STATES PATENT OFFICE.

GEORGE W. OAKES, OF CRYSTAL CITY, MISSOURI.

COMBINED DUST AND AIR CAP FOR VALVE STEMS.

Application filed December 18, 1923. Serial No. 681,395.

*To all whom it may concern:*

Be it known that I, GEORGE W. OAKES, a citizen of the United States, and a resident of Crystal City, in the county of Jefferson and State of Missouri, have invented a new and Improved Combined Dust and Air Cap for Valve Stems, of which the following is a full, clear, and exact description.

This invention relates to improvements in combined dust and air caps for valve stems, and has particular reference to a cap used in connection with pneumatic tires.

An object of the invention is to provide an improved cap which, after being placed upon the valve stem, may be easily and quickly locked thereon against displacement and removed therefrom without the necessity of unscrewing the cap for the entire length of the same.

The above and other objects will appear more clearly from the following detail description when taken in connection with the accompanying drawing which illustrates a preferred embodiment of the inventive idea.

In the drawing—

Figure 1 is a longitudinal section through the cap constructed in accordance with the invention;

Figure 2 is a similar view showing the application of the cap to a valve stem with the cap turned to its operative position;

Figure 3 is an end elevation of the cap;

Figure 4 is a transverse section on the line 4—4 of Figure 2; and

Figure 5 is a perspective view of two cooperating members forming a part of the cap.

Referring more particularly to the accompanying drawing, the numeral 6 indicates a felly of a wheel through which the usual valve stem of a pneumatic tire is extended, said stem being provided on opposite sides thereof with the flat faces 8. After a valve stem has been extended through the felly of a wheel it is usual to thread a nut or nuts 9 on the valve stem to securely maintain said stem in position.

The device of the present invention comprises the usual dust cap 10. Mounted in the open end of the dust cap 10 is a rotatable member 11, the outer surface of which is provided at oppositely disposed points with grooves 12 for receiving crimped portions 13 of the outer end of the cap 10 to prevent relative rotary movement between the cap and member 11 and at the same time permitting longitudinal movement of said member in the cap. The inner end of the member 11 is provided with an opening 14 of the same configuration as the valve stem, which opening is screw threaded at oppositely disposed points and engageable with the right hand screw thread of the valve stem after the cap 10 has been mounted over said stem, as shown in Figure 2 and given approximately a quarter revolution. This rotation of the cap 10 and member 11 draws the inner end of the cap tightly against the nut 9 to secure said cap in position. The opening 14 of the member 11 communicates with another opening 15 formed in said member which is of greater diameter than the opening 14 at the point adjacent the screw threads of the latter opening to form a shoulder 16. Said opening 15 increases in diameter toward the outer end of the member 11 so that the wall defining said opening is inclined outwardly. The portion of the member 11 defining the opening 15 is provided with a plurality of longitudinally extending slots 17 to render the same flexible so that said portion may be expanded, as will presently appear, to firmly engage the inner wall of the cap 10 to bind the member 11 in position in said cap and prevent longitudinal movement of said member relative to the cap. The wall of the opening 15 is also provided with a spiral groove 18 forming a left hand thread designed to receive a similarly shaped thread 19 formed on the outer surface of the member 20 which cooperates with the member 11. The member 20 is provided therein with an opening 21 for receiving the portion of the valve stem adjacent the outer extremity thereof and said opening is formed with opposed flat sides which engage the flat surfaces 8 of the valve stem so that rotation of the member 20 is prevented when the cap 10 is revolved. From this construction it will be apparent that when the cap 10 is rotated to engage the threads of the opening 14 with those of the valve stem the member will have a similar movement imparted thereto and will also move longitudinally of the valve stem. By reason of the left hand threads 19 of the member 20 it will also be apparent that the rotation of the member 11 will cause the member 20 to move longitudinally and inwardly with respect to the member 11 until the inner end of said member 20 engages the shoulder 16. In thus moving inwardly the side of the member 20 which engages the wall 15 of the member 11 will act as a wedge to force the portions of the member 11 between the slots 17 outwardly and into tight engagement with the inner wall of the cap 10.

The member 20 is provided upon its outer end with a reduced extension 22 forming a recess or compartment into which is inserted a rubber cushion 23 having a recess 24 for receiving the outer end of the tire valve when the parts are in the position shown in Figure 2. Thus when the cap 10 is mounted over a valve stem the reduced outer end of the latter projects into the portion 22 of the member 20 and engages with the cushion 23. When the member 20 is moved inwardly by the action of the member 11 the cushion 23 will effectively close the opening in the valve stem and thus provide an air seal which will prevent the escape of air from the tire while the cap 10 is in place. If desired, a coil spring 26 may be placed in the cap 10 between the closed end thereof and the member 11 to aid in retaining said member and the member 20 in their operative positions, as shown in Figure 1. It will, of course, be apparent that this spring 26 may be eliminated without affecting the operation of the device.

What is claimed is:

1. In a cap for valve stems, an expansible member carried by said cap and having an opening for receiving a valve stem and provided with threads for engaging those of said stem, said member also having a thread arranged opposite to that of the valve stem, and a cooperating member having a portion engageable with the first named member and provided with a thread for engaging the last named thread of said expansible member to move said cooperating member longitudinally of the expansible member to expand the latter against said cap, said cooperating member having an opening for receiving said valve stem to prevent rotary movement of said cooperating member relative to said stem.

2. In a cap for valve stems, an expansible member carried by said cap and having an opening for receiving a valve stem and provided with threads for engaging those of said stem, said member also having a thread arranged opposite to that of the valve stem, a cooperating member having a portion engageable with the first named member and provided with a thread for engaging the last named thread of said expansible member to move said cooperating member longitudinally of the expansible member to expand the latter against said cap, said cooperating member having an opening for receiving said valve stem to prevent rotary movement of said cooperating member relative to said stem, and a cushion engageable with said valve stem when said cooperating member is movable longitudinally to seal the opening in the valve stem.

3. In a cap for valve stems, a member secured to the cap in the open end thereof and having a screw thread engageable with the screw threads of the valve stem, said member being provided with a plurality of longitudinally extending slots to form expansible sections and being provided with a screw thread opposite to that of the valve stem, and a cooperating member engageable over said valve stem and prevented from rotary movement thereby, said cooperating member having a screw thread engageable with the last named screw thread in the first named member so that when the latter is rotated a longitudinal movement will be imparted to said cooperating member.

4. In a cap for valve stems, a member secured in the open end of said cap and provided with screw threads for engaging those of the valve stem and also provided with an opening extending partially therethrough, the wall of which is tapered inwardly, the portion of said member through which said opening extends being provided with a plurality of longitudinally extending slots to form flexible sections capable of being expanded, said portion of said member being also provided with a left hand thread, and a cooperating member in said opening conforming to the contour thereof and engaging the wall of said opening and having a thread engageable with said left hand thread, said cooperating member being prevented from rotating by said valve stem so that rotation of said cap and the first named member will move the cooperating member longitudinally in the opening in which it is engaged to expand the sections of the first named member into gripping engagement with said cap.

GEORGE W. OAKES.